United States Patent Office 2,920,735
Patented Jan. 12, 1960

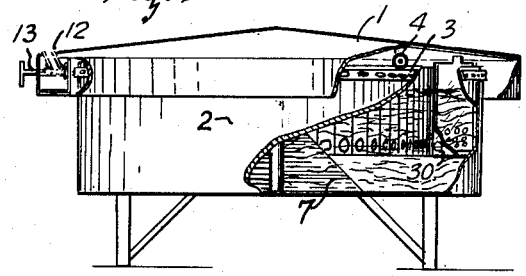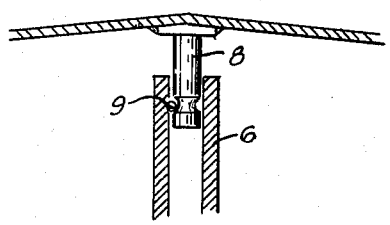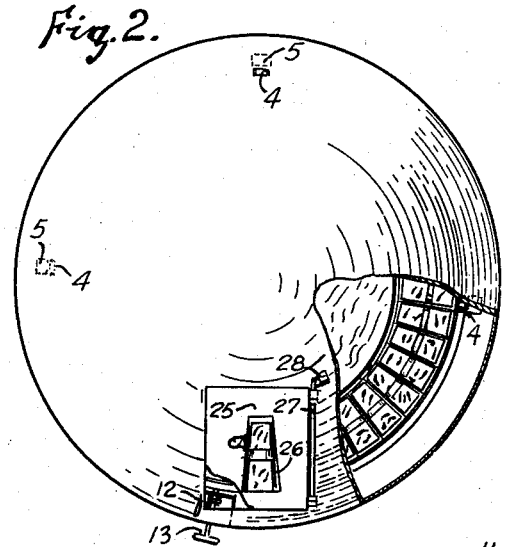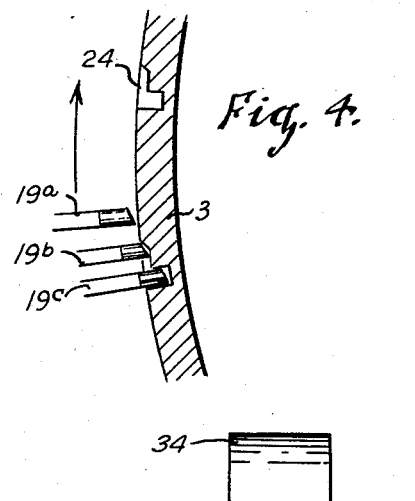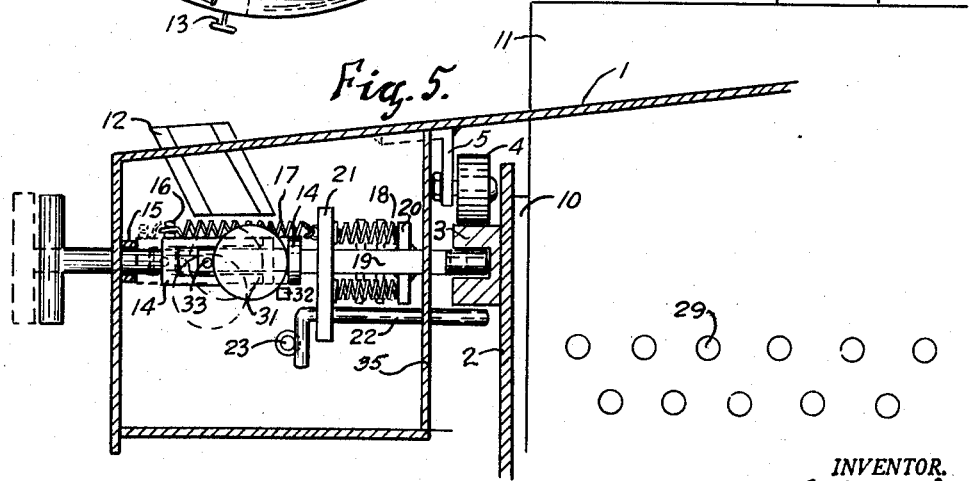
INVENTOR.
John T. Sims
BY

2,920,735

BAIT VENDING MACHINE

John T. Sims, Sikeston, Mo.

Application April 23, 1958, Serial No. 730,293

6 Claims. (Cl. 194—79)

This invention relates to new and useful improvements in coin-operated bait vending machines, and the principal object of the invention is to provide a coin-operated machine of this type which may be conveniently and effectively employed for vending live bait such as minnows, frogs, cray fish, crabs, worms, et cetera.

As such, an important feature of the invention resides in the provision of a tank or housing adapted to contain a quantity of water and provided with a plurality of individually removable bait containers immersed in the water, the housing having a rotatable cover provided with an opening through which the containers may be individually and successively removed by step-by-step indexing of the cover. Another important feature of the invention resides in the provision of a coin-actuated mechanism for rotatably indexing the cover at points where the opening in the cover is successively registered with the respective bait containers, such mechanism being arranged so as to permit rotation of the cover in one direction only.

Some of the advantages of the invention reside in its simplicity of construction, efficient and dependable operation, and in its adaptability to economical manufacture.

With the foregoing more important objects and features in view and such other objects and features as may become apparent as this specification proceeds, the invention will be understood from the following description taken in conjunction with the accompanying drawings, wherein like characters of references are used to designate like parts, and wherein:

Figure 1 is a side elevational view of the invention, shown partly in section;

Figure 2 is a top plan view thereof with the cover of the housing shown partially broken away;

Figure 3 is a fragmentary sectional detail showing the rotatable mounting at the center of the cover;

Figure 4 is a fragmentary sectional detail of the indexing means; and

Figure 5 is a fragmentary vertical sectional view of the coin-actuated indexing means, also showing one of the bait containers being removed from the housing.

Referring now to the accompanying drawings in detail, the coin-operated bait vending machine in accordance with the invention embodies in its construction a circular tank or housing 2 which has an annular side wall and an open top and is adapted to contain a quantity of water, indicated at 7.

A plurality of individually removable bait containers 11 are disposed stationarily in an annular formation in suitable compartments 10 immediately adjacent the side wall of the housing, these containers being immersed in the water in the housing so as to keep bait in the containers alive.

An annular member or ring 3 is secured externally on the upper edge portion of the side wall of the housing 2, the upper edge of this member or ring providing an annular track for a set of rotatable rollers 4 mounted by suitable angle brackets 5 at the underside of a circular cover 1 at the open top of the housing. A tubular center post 6 is provided in the housing while a depending stub shaft 8, provided at the center of the cover 1 is rotatably journalled in the upper end portion of the center post 6, whereby the entire cover is rotatably positioned on the open top of the housing. A keeper pin 9, extending transversely through the center post 6, engages an annular groove formed in the stub shaft 8, as is best shown in Figure 3, thus retaining the cover 1 in position.

The cover 1 is provided with a service door 25 having an opening 26 formed therein which opening is individually and successively registrable with the respective bait containers 11 upon step-by-step rotation or indexing of the cover, whereby the bait containers may be individually and successively removed from the housing 2 through the opening 26.

The marginal edge portion of the cover 1 projects radially outwardly beyond the side wall of the housing 2 and is provided with a down-turned annular marginal flange, whereby to protectively enclose the ring 3, rollers 4 and the coin-actuated indexing mechanism hereinafter described.

The outer face of the annular member or ring 3 is provided with a plurality of circumferentially spaced indexing recesses 24, the spacing of which corresponds to the spacing of the bait containers 11 in their annular formation in the housing 2, thus also corresponding to the steps by which the cover 1 has to be rotated in order to bring the opening 26 successively in register with the respective bait containers. The direction of rotation of the cover is shown by the arrow in Figure 4, it being also noted that each of the indexing recesses 24 has a radial edge oriented in the direction of rotation of the cover and an outwardly cam-surfaced edge oriented in the relatively opposite direction.

The coin-actuated indexing mechanism is suitably mounted in a casing 35 disposed under the projecting marginal edge portion of the cover 1 inwardly of its down-turned marginal flange, such mechanism including a radially slidable indexing pin 19 which has a cam-surfaced inner end receivable in the indexing recesses 24 as shown at 19c so as to lock the cover 1 against rotation in either direction. However, when the indexing pin 19 is retracted to the position 19b, manual rotation of the cover 1 in the direction of the arrow shown in Figure 4 is permitted, during which action the indexing pin is retracted further to the position 19a, in readiness for entry into the next indexing recess 24 upon rotation of the cover through one individual step.

The coin control for the indexing mechanism is more-or-less conventional and includes a suitable chute 12 adapted to receive a coin 31 and deliver the same to a coin stop pin 32, a latch bolt retracting pin 33 and a yoke bridge 14. The latter operatively connects the indexing pin 19 to an actuating handle 13, and when the handle 13 is pulled outwardly, the coin 31 wedged between the bridge portion of the yoke 14 and the retracting pin 33 will cause the indexing pin 19 to be retracted from the position 19c to 19b. Compression springs 18 are interposed between a keeper 20 affixed to the pin 19 and a guide 21 provided in the casing 35 for the pin 19, while tension springs 17 extend between the guide 21 and a pin 16 on the yoke 14. The handle 13 slides through a stop collar 15 in the casing 35 and when the handle is pulled outwardly until the yoke 14 engages the collar 15, the pin 19 is retracted to the position 19b and the springs 18 are compressed while the springs 17 are stretched. With the handle 13 slid outwardly, the entire cover may be turned or partially rotated by that handle, during which action the pin 19 will assume the position 19a as aforesaid, while the coin 31, having cleared the stop pin 32, will be permitted to drop to the bottom of the casing 35 which thus serves as a coin collection box. When the cover 1 is rotated so that the pin 19 comes in register with the next one of the recesses 24, the springs 18 will project the pin 19 into that recess, thus again locking the cover against rotation. Moreover, with the dropping of the coin into the casing 35, the springs 17 will cause inward sliding of the handle 13, thus conditioning the mechanism for the next cycle of operation. With the cover 1 in its new, indexed position, one of the bait containers 11 may be removed from the housing 2 through the opening 26 in register with that particular container, while the next successive bait container cannot be removed until another coin is inserted and the cover again indexed.

For purposes of water circulation, the bait containers 11 may be provided with suitable openings or apertures 29, and may also be equipped with a suitable handle 34 to facilitate lifting thereof out of the housing as well as subsequent carrying.

The cover 1 is prevented from being lifted off the housing 2 not only by the aforementioned pin 9 engaging the groove in the stub shaft 8 at the center of the cover, but also by a removable keeper pin 22 extending through the guide 21 and through the inner wall of the casing 35, with its projecting end portion underlying the ring 3. A keeper 23 provided in the casing 35 engages the inner end of the keeper pin 22 to retain the same in its projected position. Upon removal of the pins 9 and 22, the cover 1 may be separated from the housing, but access to these pins is not possible while the service door 25 is closed, the same being locked in its closed position by a suitable locking rod 27 and padlock 28. Removal of the cover 1 may be necessary for purposes of repair of the parts within the housing 2, but for purposes of refilling the housing with fresh bait containers, it is only necessary to unlock and open the service door 25, which also permits access to the interior of the casing 35, so that the indexing pin 19 may be manually retracted by the owner of the machine to the position 19a, in which position the cover 1 may be rotated in either direction, as desired for loading the machine with fresh bait containers.

It will be apparent from the foregoing that a simple, rugged and substantially tamper-proof machine has been provided which may be used in both indoor and outdoor locations without requiring the services of a vendor, which may be easily and conveniently serviced on periodic occasions, and which is otherwise well adapted for the purpose for which it is intended.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

Having thus described my invention, what I claim as new and desire to protect by Letters Patent is:

1. In a bait vending machine, the combination of a housing having an open top, a plurality of individually removable bait containers disposed stationarily in an annular formation in said housing, a rotatable cover provided on the open top of the housing and formed with an opening through which said bait containers may be individually and successively removed, and coin-controlled means for rotatably indexing said cover at points wherein said opening is successively registered with the respective bait containers, said means including an actuating handle constituting means for actuating the indexing means and for imparting rotation to said cover.

2. The machine as defined in claim 1 wherein said housing is adapted to contain a quantity of water having said bait containers immersed therein.

3. The machine as defined in claim 1 wherein said cover projects radially outwardly beyond the sides of said housing, and a downturned annular flange provided at the marginal edge of the cover, said coin-controlled indexing means being disposed and concealed under the projecting edge portion of said cover inwardly of said flange.

4. In a bait vending machine, the combination of a circular housing having an annular side wall and an open top, a plurality of individually removable bait containers disposed stationarily in an annular formation in said housing immediately adjacent said side wall, a circular cover rotatably positioned on the open top of the housing and formed with an opening individually and successively registrable with the respective bait containers whereby the bait containers may be individually and successively removed from the housing through said opening upon step-by-step rotation of the cover, means for rotatably indexing said cover at points wherein said opening is successively registered with the respective bait containers, coin-controlled means for actuating said indexing means, and means cooperating with the indexing means and with the coin-controlled means for permitting rotation of said cover in one direction only.

5. The machine as defined in claim 4 wherein said indexing means comprise an annular member provided on the side wall of said housing and formed at circumferentially spaced points with a plurality of indexing recesses, and a slidable indexing pin carried by said cover and projectable into said recesses, said coin controlled means being operatively engageable with said indexing pin for retracting the same from the recesses.

6. In a bait vending machine, the combination of a circular housing having an annular side wall and an open top, a plurality of individually removable bait containers disposed stationarily in an annular formation in said housing immediately adjacent said side wall, an annular member provided externally on the upper edge portion of said side wall, said member having an upper edge providing an annular track and an outer face formed with a plurality of indexing recesses at circumferentially spaced points thereon, a circular cover rotatably positioned on the open top of said housing and projecting radially outwardly beyond said side wall, a set or rotatable rollers provided at the underside of said cover and engaging said annular track, said cover being formed with an opening individually and successively registrable with the respective bait containers upon step-by-step rotation of the cover by steps corresponding to the circumferential spacing of said indexing recesses, each of said indexing recesses having a radial edge oriented in one direction of rotation of said cover and an outwardly cam-surfaced edge oriented in the opposite direction of rotation of the cover, a radially slidable indexing pin disposed below the marginal edge portion of the cover externally of said housing and having a cam-surfaced inner end, resilient means for urging said indexing pin radially inwardly into locking engagement with said recesses whereby to prevent rotation of the cover in both directions, and coin-actuated means carried by said cover and operatively engageable with said indexing pin whereby the pin may be partially retracted from said recesses to permit initial rotation of the cover in said opposite direction, said cam-surfaced edges of said recesses coacting with said cam-surfaced end of said pin to fully retract the pin from one recess and permit rotation of the cover in said opposite direction only toward the next recess.

References Cited in the file of this patent

UNITED STATES PATENTS

| | | |
|---|---|---|
| 2,137,031 | Smith | Nov. 15, 1938 |
| 2,278,052 | Ascheris | Mar. 31, 1942 |
| 2,634,847 | Johnson | Apr. 14, 1953 |

FOREIGN PATENTS

| | | |
|---|---|---|
| 21,678 | Norway | Aug. 21, 1911 |